July 25, 1944.  R. C. REINHARDT ET AL  2,354,478

SHAFT SEAL

Filed May 21, 1941

INVENTORS,
Robert C. Reinhardt
Raynor L. Jones
BY Lawrence N. Blackhurst

Griswold & Burdick
ATTORNEYS

Patented July 25, 1944

2,354,478

UNITED STATES PATENT OFFICE 2,354,478

SHAFT SEAL

Robert C. Reinhardt, Raynor L. Jones, and Lawrence N. Blackhurst, Midland, Mich., assignors to The Dow Chemical Company, Midland, Mich., a corporation of Michigan Application May 21, 1941, Serial No. 394,398

3 Claims. (Cl. 286—11)

This invention relates to a shaft seal, and more particularly concerns an improved bellows-type seal for preventing leakage along a rotatable shaft extending into a pressure vessel.

It is a problem to seal the opening in the wall of a vessel through which a rotatable shaft protrudes in such a manner as to prevent leakage or loss of pressure and at the same time to avoid undue shaft friction which generates heat, causes loss of power, and may even lead to injury of the shaft or the sealing device, or both. One construction commonly used as a seal for this purpose is of the so-called bellows-type in which the seal is made by two opposed annular bearing surfaces one of which is mounted on a shoulder formed on the shaft, and the other of which is held pressed against the surface by means of a flexible gas-tight metal bellows which surrounds the shaft and is fastened to the wall of the vessel; in most instances a lubricant is maintained within the bellows. While the known seals of this type are useful for a variety of purposes, they rarely can be applied satisfactorily to pressure vessels employed in chemical reactions since contamination of the vessel contents by the seal lubricant is a frequent occurrence. In addition, in the case of vessels designed to contain corrosive or condensible vapors, seals of this character are virtually useless, since these vapors invariably tend to attack the carefully machined sealing surfaces and render them no longer fluid tight.

In view of this difficulty, it is an object of the invention to provide a shaft seal which retains the advantages of the bellows-type construction, but which also is not subject to the disadvantages thereof, and may satisfactorily be applied to shafts protruding from pressure vessels adapted to contain corrosive fluids without danger of leakage or of contamination of the vessel contents.

Figure 1:
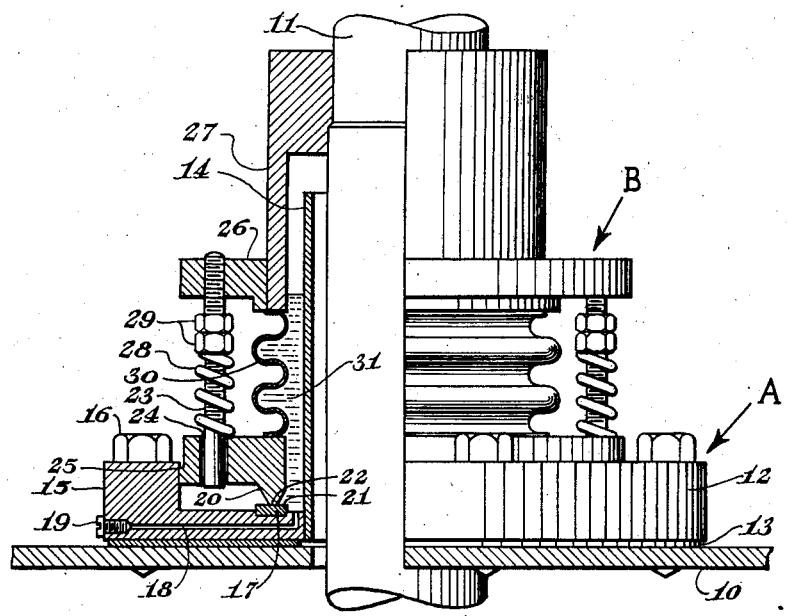
Figure 2:
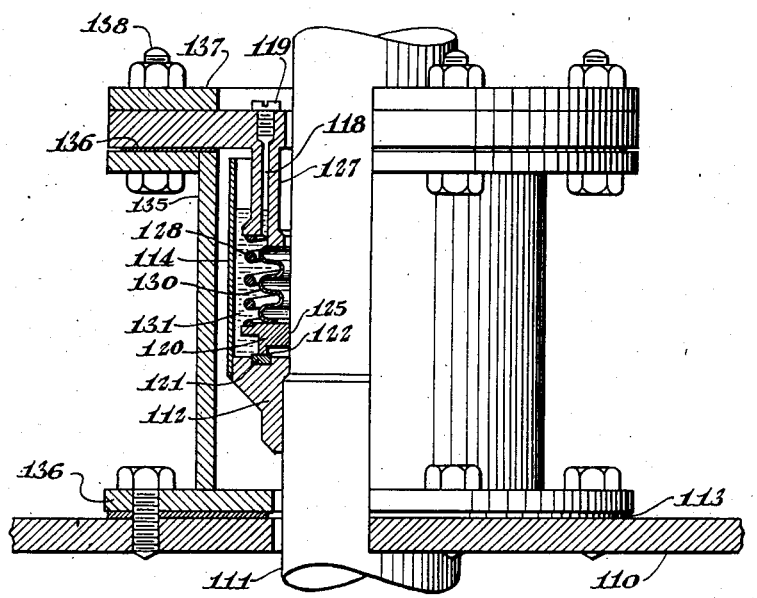

The invention may best be explained with reference to the accompanying drawing in which Fig. 1 is a view partially in cross-section of one form of the invention; and Fig. 2 is a view partially in cross-section of another form of the invention.

Seals constructed according to the principle of the invention are ordinarily composed of two sub-assemblies, each built up from a basic element. The basic element for one sub-assembly is the wall of the pressure vessel or an extension thereof, and the basic element for the other sub-assembly is the shaft itself. The shaft seal is formed by placing a portion of one sub-assembly within the other, whereby a sealing ring of one assembly seats upon a bearing surface borne by the other, these two opposed surfaces constituting the seal proper.

In Fig. 1, the seal according to the invention is employed to prevent leakage between the upper wall 10 of a pressure vessel and a vertical rotatable shaft 11 extending through an opening in the wall 10, and consists essentially of a lower stationary sub-assembly indicated generally as A and an upper sub-assembly B, the latter being fastened to and rotatable with the shaft.

The lower or stationary sub-assembly A comprises an annular flange plate 12 bolted to the vessel wall 10 in a position concentric with the opening therein, a gasket 13 being interposed between the wall 10 and plate 12 to assure fluid-tight contact. Erected vertically upon the flange plate 12 and integral therewith is an elongated hollow cylindrical liquid-retaining member or sleeve 14, which is also concentric with the vessel opening and surrounds the shaft 11 with only a small clearance. The periphery of the flange plate is formed with a raised annular shoulder 15 of rectangular cross-section, which serves as a bolt-circle for the capscrews 16 holding the entire sub-assembly A to the vessel wall 10; the inner vertical surface of this shoulder 15 is highly finished to provide a bearing surface, as hereinafter further explained. Seated in a circular groove in the upper face of the flange plate 12 and encircling the shaft 11 concentric therewith at a position outside the sleeve 14 is an annular member 17 of wear-resisting material, the upper face 21 of which is finished as a bearing surface. A fluid inlet line 18 is formed in the flange plate leading from the outside to a point between the bearing member 17 and the sleeve 14, the inlet being normally closed with a screw-plug 19.

The upper rotatable sub-assembly B essentially comprises a sealing ring 20 which encircles the shaft 11 outside the stationary sleeve 14, and is provided on its lower face with a highly finished annular bearing surface 22 adapted to oppose and press against the corresponding stationary bearing surface 21 already mentioned, these two surfaces together forming a running seal. The sealing ring 20 is caused to rotate with the shaft 11 by means of driving pins 23 which extend into holes 24 drilled in the ring 20 in such manner as to receive the pins in an easily slideable fit, and is steadied in its rotation by a bearing surface 25 on its outer periphery which rides on the stationary flange shoulder 15. The pins 23 are threaded at their upper end into a collar 26 formed integrally with the lower portion of a bell 27 which is secured at its top to the shaft 11 by a fluid-tight joint in such position as to enclose the upper end of the sleeve 14. The sealing ring 20 is prevented from unseating by thrust springs 28 which fit around the pins 23 and may be adjusted by means of lock nuts 29. Extending between the bearing ring 20 and the bell 27 and encircling the sleeve 14 is a hollow cylindrical metal bellows 30 sealed to both the ring and the bell. The bellows 30 serves to maintain the ring 20 in fluid-tight connection with the shaft 11, and yet at the same time is sufficiently flexible so that wobbling and other eccentricities in the rotation of the shaft are not transmitted to the ring 20 and hence do not tend to affect the tightness of the seal formed between the ring 20 and the annular bearing 17.

The bellows 30 and the bell 27 to which it is attached constitute one of two liquid-retaining members, the other of which is the stationary sleeve 14 which extends within the bellows 30 out of contact therewith, these two members together forming a liquid reservoir 31 which is in communication with the interior of the vessel through the shaft opening. This reservoir 31 is normally filled to a level above the bellows 30 by a lubricant sealing fluid, such as oil, introduced by way of the fluid inlet line 18 in the stationary flange 12.

In operation of the seal shown in Fig. 1, when the shaft 11 is rotating, the bell 27, the bellows 30, the sealing ring 20, and attached parts, are also in rotation, while the flange 12, annular bearing surface 21, and sleeve 14 remain stationary. The seal proper is formed solely by the two opposed relatively rotatable highly finished bearing surfaces 21 and 22, one of which is in fluid tight connection with the shaft 11 and the other with the sleeve 14. These sealing surfaces 21 and 22 and the bellows 30 are protected from direct contact with any corrosive vapors within the vessel 10 by the sealing liquid, which also acts as a lubricant for the moving surfaces 21 and 22.

The seal illustrated in Fig. 2 is likewise designed to prevent leakage between a vessel 110 and a shaft 111 extending through an opening therein, but differs from the construction of Fig. 1 in that the upper sealing ring and attached bellows are stationary, while the lower sealing surface is rotatable with the shaft 111.

As shown, the rotatable portion of the seal comprises a lower annular bearing surface 121 encircling the shaft 111 and embedded in a collar 112 mounted thereon, and an elongated hollow cylindrical liquid retaining sleeve 114 welded to the collar 112 at its periphery and extending upwardly therefrom.

The stationary part of the seal is contained in a hollow cylindrical flanged housing 135 which is mounted integrally on an annular base plate 136 bolted to the vessel wall 110 in a position concentric with the shaft opening. A gasket 113 is interposed between the base plate 136 and the wall 110 to prevent leakage. The essential stationary sealing element is an annular sealing ring 120 having a highly polished bearing surface 122 adapted to oppose and press against the rotatable lower bearing surface 121, these two surfaces together forming a running seal. The sealing ring 120 is steadied by an inner shoulder 125 which is adapted to fit closely around the shaft, and is held stationary by a hollow cylindrical mounting 127 encircling the shaft 111, being sealed to the mounting by a flexible metal bellows 130. A helical thrust spring 128 is seated on the bottom of the mounting 127 and extends downwardly outside the bellows 130 to hold the sealing ring 120 against the rotatable bearing surface 121. The mounting 127 is formed with an upper flange which rests on the housing 135, being sealed thereto by a gasket 136 and held in position by a ring 137 which may be tightened by bolts 138. The upper flange is formed with a fluid inlet 118 leading from the outside to a point adjacent the outside of the bellows, this inlet being normally closed by a plug 119.

In this seal, the space 131 between the liquid-retaining sleeve 114 and the bellows 130 and its mounting 127 constitutes a liquid reservoir in communication with the interior of the vessel through the shaft opening. Lubricant sealing liquid is maintained in this reservoir at a level above the top of the bellows 130, being injected through the fluid inlet 118 and serving to lubricate the sealing surfaces 121 and 122 as well as to protect them from contact with any vapors which may be generated in the vessel.

In either embodiment of the invention illustrated, the opposed relatively rotatable annular bearing surfaces must be finished with considerable care, since the effectiveness of the seal depends upon an accurate fit of these surfaces one on the other. Ordinarily they are made from an anti-friction bearing material such as leaded bronze, porous bronze impregnated with oil, or a carbon or graphite composition. The materials utilized must have sufficient mass to resist warping tendencies incidental to the assembly of the seal and the high temperatures encountered in service. The bearings should be designed with particular care so that adequate lubrication of the entire sealing surface is obtained while at the same time the surface area should be sufficiently great to avoid excessive bearing loads. In finishing the opposed surfaces, i. e., that of the sealing ring and the annular bearing, some special process such as lapping is usually found to be desirable.

The invention provides an improved seal for pressure vessels which retains all the advantages of the bellows-type seal but which also is fully protected against attack by corrosive vapors within the vessel, and does not tend to contaminate the contents thereof. The seal is also readily adaptable to use on evacuated vessels.

Other means of applying the principle of the invention may be employed instead of those explained, change being made as regards the details, provided the elements recited in any of the following claims, or the substantial equivalent thereof, be employed.

We claim:

1. In combination with a closed vessel having a shaft opening in the top wall thereof and a vertical rotatable shaft extending through the opening, a shaft seal comprising: two opposed relatively rotatable annular bearing members encircling the shaft, one above the other, the lower member being mounted on the shaft and in fluid-tight relation with it; a hollow liquid-retaining member encircling the shaft above the bearing members, said member being sealed at its lower end to the upper bearing member and at its upper end being firmly mounted in fluid-tight relation with the vessel wall; and a second hollow liquid-retaining member mounted on the shaft co-axial therewith and surrounding the first liquid-retaining member, the lower end of said retaining member being in fluid-tight relation with the aforesaid lower bearing member, the space between the retaining members constituting a liquid reservoir in open communication with the interior of the vessel through the shaft opening in the vessel wall.

2. In combination with a closed vessel having a shaft opening in the top wall thereof and a vertical rotatable shaft extending through the opening, a shaft seal comprising: two opposed relatively rotatable annular bearing members encircling the shaft, one above the other, the lower member being mounted on the shaft and in fluid-tight relation with it; a substantially cylindrical metal bellows encircling the shaft above the bearing members, said bellows being sealed at its lower end to the upper bearing member and at its upper end being firmly mounted in fluid-tight relation with the vessel wall; and a hollow, cylindrical, liquid-retaining member mounted on the shaft co-axial therewith and surrounding the bellows, the lower end of said retaining member being in fluid-tight relation with the aforesaid lower bearing member, the space between the bellows and retaining member constituting a liquid reservoir in open communication with the interior of the vessel through the shaft opening in the vessel wall.

3. In combination with a closed vessel having a shaft opening in the top wall thereof and a vertical rotatable shaft extending through the opening, a shaft seal comprising: two opposed relatively rotatable annular bearing members encircling the shaft, one above the other, the lower member being mounted on the shaft and in fluid-tight relation with it; a substantially cylindrical metal bellows encircling the shaft above the bearing members, said bellows being sealed at its lower end to the upper bearing member and at its upper end being firmly mounted in fluid-tight relation with the vessel wall; a hollow, cylindrical, liquid-retaining member mounted on the shaft co-axial therewith and surrounding the bellows, the lower end of said retaining member being in fluid-tight relation with the aforesaid lower bearing member, the space between the bellows and retaining member constituting a liquid reservoir in open communication with the interior of the vessel through the shaft opening in the vessel wall; and means for introducing lubricant sealing liquid into the said reservoir.

ROBERT C. REINHARDT.
RAYNOR L. JONES.
LAWRENCE N. BLACKHURST.